United States Patent [19]
Jaeger et al.
[11] Patent Number: 4,503,111
[45] Date of Patent: Mar. 5, 1985

[54] HYDROPHOBIC SUBSTRATE WITH COATING RECEPTIVE TO INKS

[75] Inventors: Charles W. Jaeger, Beaverton; Donald R. Titterington, Cornelius; Le P. Hue, Beaverton, all of Oreg.

[73] Assignee: Tektronix, Inc., Beaverton, Oreg.

[21] Appl. No.: 493,127

[22] Filed: May 9, 1983

[51] Int. Cl.[3] ........................ B32B 27/06; B05D 5/06; G01D 15/18

[52] U.S. Cl. .................................... 428/195; 346/1.1; 346/135.1; 400/126; 427/164; 427/209; 427/261; 427/407.1; 427/414; 428/203; 428/207; 428/478.2; 428/480; 428/483

[58] Field of Search ............... 428/195, 135, 207, 203, 428/537, 342, 478.2, 480, 483; 427/261, 164, 407.1, 414, 209; 346/1.1, 135.1; 400/126

[56] References Cited

U.S. PATENT DOCUMENTS

| | | | |
|---|---|---|---|
| 3,889,270 | 6/1975 | Hoffmann et al. | 346/1.1 |
| 4,269,891 | 5/1981 | Minagawa | 428/135 |
| 4,301,195 | 11/1981 | Mercer et al. | 427/261 X |
| 4,352,901 | 10/1982 | Marwell et al. | 524/41 X |
| 4,425,405 | 1/1984 | Murakami et al. | 428/342 |

FOREIGN PATENT DOCUMENTS

| | | | |
|---|---|---|---|
| 55-146786 | 11/1980 | Japan | 428/195 |
| 2050866 | 1/1981 | United Kingdom | 428/195 |

OTHER PUBLICATIONS

W. Crooks et al., IBM Technical Disclosure Bulletin, vol. 21, No. 6, Nov. 1978.

*Primary Examiner*—Thomas J. Herbert
*Attorney, Agent, or Firm*—John D. Winkelman

[57] ABSTRACT

A recording material, comprising a hydrophobic substrate material with a polymeric coating, has excellent receptivity for inks that do not normally wet hydrophobic substrates. The substrate material is coated with a mixture of polyvinylpyrrolidone and a compatible matrix-forming polymer. The matrix-forming polymer is a material, such as gelatin or polyvinyl alcohol, that is swellable by water and insoluble at room temperature but soluble at elevated temperatures. A transparent base sheet, such as cellulose acetate or polyethylene terephthalate, can be coated with the mixture of polymers to provide a sheet material which can be used in ink jet printers and in pen-type graphics recorders, operating at normal speeds, to record large color-filled areas without puddling, running, or wetness and with high color density and excellent resolution.

8 Claims, No Drawings

HYDROPHOBIC SUBSTRATE WITH COATING RECEPTIVE TO INKS

SUMMARY OF THE INVENTION

The present invention relates to printing or recording, and more particularly to printing on a hydrophobic medium such as a transparent polymeric film.

In recent years, use of the ink jet recording process has been rapid growth because of its speed, flexibility, and relatively low cost. The basic process employs one or more electrically driven ink jet print heads, each connected to a suitable ink source. The print heads are mounted on a lead screw which traverses the head across a recording medium mounted on a rotating cylinder. Each print head includes a tiny discharge orifice which may range from a diameter of about 10–200 microns, more typically about 40–50 microns. The heads are energized by a magnetostrictive or piezoelectric means to emit a modulated stream of ink droplets. These droplets are directed onto the nearby sheet of compatible recording material to form a replica of the image being transmitted. Exemplary apparatus for ink jet recording is described in detail in U.S. Pat. Nos. 3,747,120 to Stemme, 3,940,773 to Mizoguchi et al., 4,072,958 to Hayami et al., and 4,312,007 to Winfield.

The inks used in the ink jet recording process as currently practiced are aqueous compositions comprising principally a water soluble dye, a wetting agent, a humectant and water. The dyes are most typically direct or acid types. To these basic components of the inks may be added minor amounts of other materials as required, such as oxygen absorbers, ultraviolet light absorbers, fungicides, and inorganic salts. The viscosity, surface tension, and electrical characteristics of the ink compositions are adjusted to meet the specific requirements of the ink jet apparatus with which the ink will be used. As examples of specific ink compositions and a discussion of their constituents, reference is made to U.S. Pat. Nos. 3,846,141 to Ostergren et al., 4,256,493 to Yokoyama et al., 4,279,653 to Makishima et al., and 4,352,901 to Maxwell et al.

As in the case of images produced by photographic processes, there are two basic forms of ink jet recordings. These are reflection-type displays (prints) and transmission-type displays (transparencies). The display form selected depends upon the end use of the finished record and the circumstances under which it will be viewed. For images that will be viewed by reflected light, the usual recording medium is high quality paper. Pigments or coatings may be added to the paper to improve image quality. Examples of papers specifically modified to achieve improved ink jet recordings are found in U.S. Pat. No. 3,889,270 to Hoffmann et al., 4,269,891 to Minagawa, and in European patent application No. 0046416. These papers will frequently have a surface coating of a pigment which may be dispersed within a polymeric substrate. When printed, the dye in the jet ink is adsorbed by the pigment at the outer surface while the water is carried away rapidly into the hydrophylic, cellulosic sheet. High opacity is one property sought after in the coatings.

While paper is inherently receptive to the aqueous inks used in ink jet recording, many printing surfaces are not. For example, the plastic films employed in the production of transparencies generally have hydrophobic (water resisting) surfaces. These substrates include such well known materials as cellulose acetate and polyesters; e.g. polyethylene terephthalate, as well as other similar commonly used polymeric materials that can be formed into colorless, transparent films. Such surfaces are not readily wetted and tend to repel water-based dye solutions, causing the ink droplets to coalesce into larger drops or puddles. This severely limits the amount of ink that can be deposited on the recording medium and has adverse effects on the appearance, density and resolution of the recorded image. Graphic images having sizable solid filled areas of color cannot be printed satisfactorily on such substrates. Nevertheless, the desirable physical characteristics of certain plastic films, such as polyethylene terephthalate, make them attractive candidates for ink jet record substrates. Some work has been done to provide a separate ink absorbing layer on such films using a substance that is wetted by aqueous inks and that functions as the image receiving layer. U.S. Pat. No. 4,301,195 to Mercer et al. is such an example.

Unfortunately, until the present time, there has been no acceptable ink jet recording material for use in making transparencies which have the desired resolution, uniformity and color density. The present invention is a major advance in producing a transparent ink jet recording material which overcomes the deficiencies in those presently available.

The present invention comprises a hydrophobic substrate that has a surface coated with a polyvinylpyrrolidone. For rapid drying, such a surface is coated with a mixture of at least two polymeric substances including polyvinylpyrrolidone (PVP) and a compatible hydrophylic polymer having matrix-forming properties.

A particularly useful rapid-drying embodiment is transparent recording medium for use with ink jet printers and with pen recorders employing single or multiple pens having aqueous inks. Such a recording medium comprises a transparent, hydrophobic substrate sheet which is uniformly coated, on at least one side, with a highly transparent mixture of the polymeric substances.

The polyvinylpyrrolidone should be of a molecular weight which renders it soluble in water at room temperature. While many types of polyvinylpyrrolidone are satisfactory, it is preferred that this component have a molecular weight of at least 90,000, preferably about 350,000. Higher molecular weights are also suitable as long as they maintain ready water solubility at room temperature. Molecular weights below 90,000 may be usable if thickening agents are included to increase the viscosity of the solution.

The matrix-forming polymer must be soluble in water at elevated temperatures and insoluble but swellable by water at room temperature. A ratio of polyvinylpyrrolidone to matrix-forming polymer should normally be chosen in the range of 1:3 to 3:1 with a ratio of approximately 1:1 being a preferred composition.

Matrix-forming polymers may be selected from a wide variety of materials including starches, modified starches, oxidized starches, carboxymethyl cellulose, hydroxyethyl cellulose, casein, soy bean protein, water soluble gums, polyacrylamides, polyvinyl alcohol, and gelatin as examples. Of this group of materials gelatin and polyvinyl alcohol are prefered.

When fully hydrolyzed polyvinyl alcohol is chosen as the matrix-forming material, the types which have been found to be the most suitable are those which have molecular weights of less than 60,000. Polyvinyl alcohols that are only partially hydrolyzed can be of a higher molecular weight. For example, good results are achieved using 98 percent hydrolyzed polyvinyl alcohol having a molecular weight of 79,000.

Many types of animal-derived gelatin are suitable for the matrix-forming material, and the optimum type for any particular formulation can be readily determined experimentally. One type that has given superior results in some formulations is type A pig skin gelatin.

While normally the base sheet of a transparent recording medium will need to be coated on only one side, it may be desirable in some circumstances to coat both sides of the sheet. This might be the case where a thin base sheet is employed and a balanced coating is desirable to reduce curl. Under these circumstances, the back-side coating need not be the same polymer mixture as is applied to the image receiving side. Another condition where double coating with image receiving polymer might be desirable is when it is wished to avoid any possible confusion by the user in determination of the side of the recording sheet which should face the ink jet mechanism.

It is an object of the present invention to provide a hydrophobic substrate that has a surface highly receptive to the aqueous inks.

A particular object is to provide a transparent recording medium for use with ink jet printers to produce graphic transparencies suitable for projection.

It is another object to provide a transparent ink jet recording material which gives improved resolution and is resistant to puddling or smearing of the aqueous ink which is applied.

It is a further object to provide a transparent ink jet recording material which will dry rapidly without residual tackiness.

It is still another object to provide an ink jet recording material which can reproduce images having high color densities.

These and many other objects of the invention will become readily apparent to those skilled in the art upon reading the following detailed description.

DETAILED DESCRIPTION

The present invention is based upon the discovery that a coating which includes a highly hydrophylic, highly water soluble polymer, such as polyvinylpyrrolidone, particularly when used with another hydrophylic but less water soluble polymer, such as gelatin, has superior performance characteristics in receiving inks that do not readily wet hydrophobic substrates.

The following definitions may be helpful to the understanding of the discussion that follows.

"Ink receptivity" is defined as the ability to rapidly absorb the ink so that a minimal amount of flow occurs beyond the immediate locale where the ink droplet was deposited.

"Puddling" is a phenomenon caused by poor ink receptivity in which adjacent droplets coalesce into a sheet of liquid ink which tends to flow, particularly along the edges of solid fill areas of the image.

"Resolution" relates to the distinguishability of individual parts of a printed image. In reference to ink jet printing, resolution specifically relates to the number of image scan lines per unit length which can be made without adjacent lines coalescing.

"Wetness" relates to the drying time of an ink image. This is the time required so that the ink image being printed on the substrate material will not transfer to another surface.

"Tackiness", which might also be defined as "stickiness", is an indication of the tendency of image in a solid fill area to stick to another surface to which it might be in contact.

A "matrix-forming polymer" is a hydrophylic material that is swellable but not soluble in water at room temperature and which is compatible with and will hold polyvinylpyrrolidone in a dispersed condition yet will prevent it from flowing or moving to a different location within the matrix when the polyvinylpyrrolidone is in contact with water in a localized area.

"Room temperature" is the temperature range normal in the human living and working environment between about 15° C. and 35° C.

A substrate material according to the present invention is any hydrophobic material which will accept, or can be made to accept, the coatings employed in the present invention. For a transparent recording medium, the substrate material can be a base sheet made from any flexible, transparent plastic material. The most typical materials that might be used for a recording medium base sheet are cellulose acetate, cellulose triacetate, or polyester (polyethylene terephthalate). While somewhat more expensive than the cellulose acetate products, the latter is becoming increasingly preferred because of its excellent permanency and dimensional stability. A suitable polyethylene terephthalate film is available from E. I. du Pont de Nemours & Co., Inc., Wilmington, Del., as Mylar film. This product is available in various widths and thicknesses. Film having a thickness of about 0.102 mm (0.004 in) has been found to be of about optimum thickness from the standpoint of handleability. However, sheets of a thickness of about 0.076 mm (0.003 in) will work better in some printers.

Polyethylene terephthalate base sheets are relatively hydrophobic, and it can be difficult to apply a water based coating to them. This problem can be overcome in a number of ways. The polyester film itself may be surface treated; e.g., by means of corona discharge, to better accept the coating. A second method is the use of an intermediate coating which has good affinity for both the base film and the surface coating. Gelatin is an example of such a material. Another method is to use a solvent system for the coating that wets the base sheet better than water alone. Alcohol can be included in an aqueous solvent system to achieve the necessary good wetting required to obtain uniform coatings. This is the method that was chosen in the example to be described later where the coating was made using a 50:50 solution of water:alcohol. Either ethanol or methanol is satisfactory. Where a gelatin film is applied from an alcoholic solution, it is necessary to make the solution slightly acidic in order to achieve adequate solubility. A small amount of acetic acid added to the solution can accomplish this purpose.

One necessary characteristic of the coating is a high receptivity for the dyes normally used in jet inks. These are typically either direct or acid types of dyes. In general, a substance containing amine groups, which may be primary, secondary, or tertiary, or amide linkages, is desirable for good receptivity.

While gelatin, used alone, would appear to be an ideal coating in view of these criteria, a pure gelatin coating does not yield good ink jet printed images, particularly in portions having relatively large areas of solid fill. The reason for this is somewhat unclear, but it appears to be due to a relatively slow rate of water absorbency from the inks. This allows puddling to occur when inks are applied at their normal usage rates. For high resolution graphics printers, ink coverage is in the order of 1.5 $\mu L/cm^2$. The ink is applied at a rate of 5.7 $cm^2/sec$. This is a very substantial amount of aqueous liquid to be applied to the substrate. But, if a much lower coverage rate is chosen, optical density of the resulting images becomes unacceptable.

Polyvinylpyrrolidone (PVP) has been found to have outstanding properties in regard to ink receptivity and minimization of puddling problems when used as a base sheet coating for transparent ink jet recording materials. When polyvinylpyrrolidone is used by itself as a coating, aqueous inks form an acceptable image, but dry slowly. For an extended period of time after the ink is applied, the image shows both wetness and tackiness, especially in areas of solid fill. Thus, sheets coated with PVP alone are not suitable for use in a high speed, automatically feeding printer. While we do not wish to be bound by any particular theory, it appears that the ink is actually dissolving part of the PVP coating, forming a viscous and tacky solution of PVP in the ink which must then dry be evaporation of the water with the coating reforming as the water leaves. This property also appears to be responsible for the excellent ink receptivity and resistance to puddling shown by PVP coatings. Apparently, the viscosity of each individual ink droplet on the film is increased by incorporation of the polymer and its resistance to moving from where it landed seems to be greatly increased as it begins to dissolve PVP.

Surprisingly, the tackiness and puddling problems of PVP has been overcome by including a second polymer in the film forming mixture which is fully compatible with PVP but which has different solubility characteristics. We theorize that this second polymer forms a matrix in which the PVP is intimately mixed at a colloidal or molecular level. The second polymer should also be hydrophylic in nature but one that is not readily dissolved in water at room temperature. Gelatin and polyvinyl alcohol (PVA) are examples of polymers which have proved particularly satisfactory for this purpose. Both are soluble in hot water, and the mixture of PVP with either polyvinyl alcohol or gelatin can be cooled sufficiently so that the substrate or base sheet can be coated before the coating sets into a gel.

Coatings formulated with a mixture of PVP and either gelatin or polyvinyl alcohol have shown excellent characteristics. The coatings show high ink receptivity to aqueous inks with excellent resistance to puddling and freedom from tackiness. The reason for this superior performance appears to be that neither polyvinyl alcohol nor gelatin are dissolved by the ink. They are believed to retain their three-dimensional lattice structure in which the PVP is dispersed. When an ink droplet lands on the coating, the water first is rapidly taken up by the PVP. The water then moves into the matrix-forming polymer which can swell to accept the water from the ink as the lattice becomes hydrated.

Polyvinylpyrrolidone is available as a commercial chemical from a number of suppliers. While the particular type used in the coating of the present invention does not appear to be critical, those with the highest molecular weights which still retain good water solubility at room temperature are the preferred materials. These generally should have molecular weights of 90,000 or greater, preferably about 350,000, and should not be crosslinked or be only lightly crosslinked in order not to adversely affect room temperature solubility in water. Molecular weights below 90,000 may be usable if thickening agents are included to increase the viscosity of the solution. Examples of such thickeners include naturally occurring gums, agarose, and polyacrylic acid polymers.

The ratio of polyvinylpyrrolidone to matrix-forming polymer is broadly critical, and compositions falling within the ratios of 3:1 to 1:3 appear to work satisfactorily. Generally, the best results have been obtained when the ratio of PVP to matrix-forming polymer is about 1:1. More specifically, the optimum ratio was about 1:1 for the best PVP:PVA mixture, and 3:2.5 for the best PVP:gel mixture. The rate of ink receptivity appears to increase with increasing amounts of PVP. However, drying time to achieve a nonsmearing image and the tendency to form tacky films also increases.

The composition of polyvinyl alcohol used as the matrix-forming polymer does appear to be broadly critical. If essentially fully hydrolyzed types are used, the PVA must have a molecular weight below 60,000 to obtain a transparent coating. Fully hydrolyzed polyvinyl alcohols having molecular weights of approximately 40,000 have given excellent performance in combination with PVP. Polyvinyl alcohols that are less than fully hydrolyzed, and thus have a greater percentage of acetate substitution, can be of a higher molecular weight. For example, excellent ink receptivity, drying times, and transparency are obtained with a 98 percent hydrolyzed polyvinyl alcohol of 79,000 molecular weight. When a high molecular weight PVA is used, it is necessary to increase the ratio of PVP to PVA in order to obtain a coating that is most hydrophylic. The optimum ratio of PVP to PVA can be determined by experiment. There is a limit to the degree of hydrolysis that can be allowed for the PVA. Below about 85 percent hydrolysis, PVA in a coating will cause a substantial decrease in ink receptivity.

The reason for these broad limitations on the nature of the polyvinyl alcohol lies in the nature of the film which they produce. The films rapidly lose transparency as molecular weight increases above the 60,000 range for a fully hydrolyzed polyvinyl alcohol. While this is not any particular problem when the present compositions are being used as a coating on many hydrophobic substrate materials, it is unacceptable for a recording material that is to be used as a transparency.

The following examples will serve to better illustrate the best known modes of practicing the invention at the present time.

EXAMPLE 1

A 0.102 mm (4 mils) Mylar film (a trademarked polyethylene terephthalate product of E. I. du Pont de Nemours and Company, Wilmington, Del.) was coated with a 5 percent solution of 360,000 m.w. polyvinylpyrrolidone (Aldrich Chemical Co., Milwaukie, Wis.) dissolved in a 50:50 (by volume) mixture of ethanol/water. The wet coating was approximately 0.33 mm (13 mils) in thickness and yielded a dry coating about 0.13 mm (0.5 mil) in thickness. This product was air dried. It was then tested on an ink jet printer using 50 micron jets at about 51 lines/cm. Copies showed excellent resolution and color density and were essentially free from puddling, even along the edges of the solid fill areas. However, the images tended to be quite tacky for several minutes. Complete dryness required six to eight hours.

EXAMPLE 2

5.0 g of a type A pigskin gelatin (Kind and Knox Type 2945; Kind and Knox division of Knox Gelatin, Inc., Cherry Hills, N.J.) was allowed to swell in 100 ml of deionized water for 30 minutes. The solution was then stirred and heated to 60°-70° C. until the gelatin was dissolved, at which time 100 ml of ethanol was added, whereupon the solution became somewhat cloudy. 6.0 g of 360,000 m.w. PVP (Aldrich) was then added to the solution. After the PVP had dissolved, acetic acid was added dropwise until the solution was completely clear. After cooling to about 35° C., the solution was coated at a wet thickness of about 0.33 mm (13 mils) on a 0.102 mm, (4 mils) subbed polyethylene terephthalate film. Final dry thickness of the coating was approximately 0.013 mm (0.5 mil).

The coated base sheets were tested on an ink jet printer using a 50 microns orifice at a setting of 51 lines/cm. Transparencies were obtained which had excellent resolution and color density without any indication of puddling. Air drying of the solution at ambient temperature gave a film with good ink receptivity that would not adhere to or transfer ink to paper 15 seconds after being printed. Oven drying of the coating solution at 100° C. gave a film that had excellent ink receptivity and that would not adhere to or transfer ink to a piece of paper 3 minutes afte being printed.

EXAMPLE 3

A mixture including 5.0 g 360,000 m.w. PVP and 5.0 g of fully hydrolyzed 40,000 m.w. PVA (90-50 Elvanol, medium viscosity; E. I. Du Pont de Nemours & Company, Inc., Wilmington, Del.) was dissolved in 100 ml of deionized water. The solution normally was heated to speed up the dissolution. The solution was allowed to cool to room temperature, then was coated on subbed polyethylene terephthalate film and dried at 100° C. to give a coating with a final dry thickness of 0.010 mm (0.40 mil). Copies made as in Example 2 showed the same excellent characteristics. No difference in performance of the film was noted when the film was allowed to dry at room temperature as compared to being dried, as described in Example 2, in an oven at 100° C. for 2-3 minutes.

EXAMPLE 4

Example 3 was repeated using a 98 percent hydrolyzed PVA of 79,000 m.w. (Vinol 325; Air Products and Chemicals, Inc., Wayne, Penn.) with a PVP:PVA ratio of 3:2. The copies made showed excellent characteristics.

EXAMPLE 5

Samples made as in Examples 1-4 using only gelatin or polyvinyl alcohol as the coating material produced inferior images. While these lacked the tackiness of those made with PVP alone, they tended to puddle badly, an indication of a low rate of ink absorbency.

While the coatings described in the above examples were either air dried or dried at a fixed elevated tempeature, it will be understood that on a commercial production basis, other drying methods will be preferred. Severe and very rapid drying at high temperatures is to be avoided. Dryers having successive zones in which temperature and humidity can be closely controlled are in common use in the coating art and are the preferred types. The final coating should be at least 0.005 mm (200 μin) thick so that aqueous inks will dry rapidly after application.

It will be apparent to those skilled in the art that many departures can be made in both the compositions and process without departing from the spirit of the present invention. For example, matrix-forming polymers other than those described are believed to be suitable. It will be apparent that a coating according to the invention may be applied on hydrophobic substrates other than polymeric films, such as ceramic and metal surfaces of electronic components and machine parts. Furthermore, the benefits of the present invention exist when ink is applied to a coated hydrophobic substrate by printing procedures that do not employ an ink jet. The invention should thus be accorded its full scope of protection and is considered to be limited only by the following claims.

We claim:

1. A transparent recording medium for ink jet printing, comprising a transparent support layer having a substantially hydrophobic surface with a transparent surface coating receptive to aqueous inks, said coating comprising a mixture of polyvinylpyrrolidone and a compatible matrix-forming hydrophilic polymer selected from the group consisting of gelatin and polyvinyl alcohol, the ratio of polyvinylpyrrolidone to matrix-forming polymer being in the range of 1:3 to 3:1, the polyvinylpyrrolidone having a molecular weight of at least 90,000.

2. The recording medium of claim 1, wherein said support layer has opposed major surfaces, at least one of which is substantially hydrophobic, and both surfaces have a transparent surface coating comprising a mixture of polyvinylpyrrolidone and a compatible matrix-forming hydrophilic polymer.

3. The recording medium of claim 1, wherein the matrix-forming polymer is an essentially fully hydrolyzed polyvinyl alcohol having a molecular weight of less than 60,000.

4. The recording medium of claim 1, wherein the matrix-forming polymer is gelatin derived from pig skin.

5. A process for making an improved transparent ink jet recording medium, comprising the steps of providing a transparent support layer having a substantially hydrophobic surface, and applying a transparent, aqueous ink-receiving coating to said surface, said coating comprising a mixture of polyvinylpyrrolidone and a compatible matrix-forming hydrophilic polymer selected from the group consisting of gelatin and polyvinyl alcohol, the ratio of polyvinylpyrrolidone to matrix-forming polymer being in the range of 1:3 to 3:1, the polyvinylpyrrolidone having a molecular weight of at least 90,000.

6. The process of claim 5, comprising the further steps of applying a transparent, aqueous ink-receptive coating to the opposite surface of said substrate, said coating comprising a mixture of polypyrrolidone and a compatible matrix-forming hydrophilic polymer.

7. The process of claim 5, wherein the matrix-forming polymer is an essentially fully hydrolyzed polyvinyl alcohol having a molecular weight of less than 60,000.

8. The process of claim 5, wherein the matrix-forming polymer is gelatin derived from pig skin.

* * * * *